June 18, 1929.　　P. P-G. HALL　　1,717,380
MILLING CUTTER
Filed Jan. 28, 1925　　2 Sheets-Sheet 2
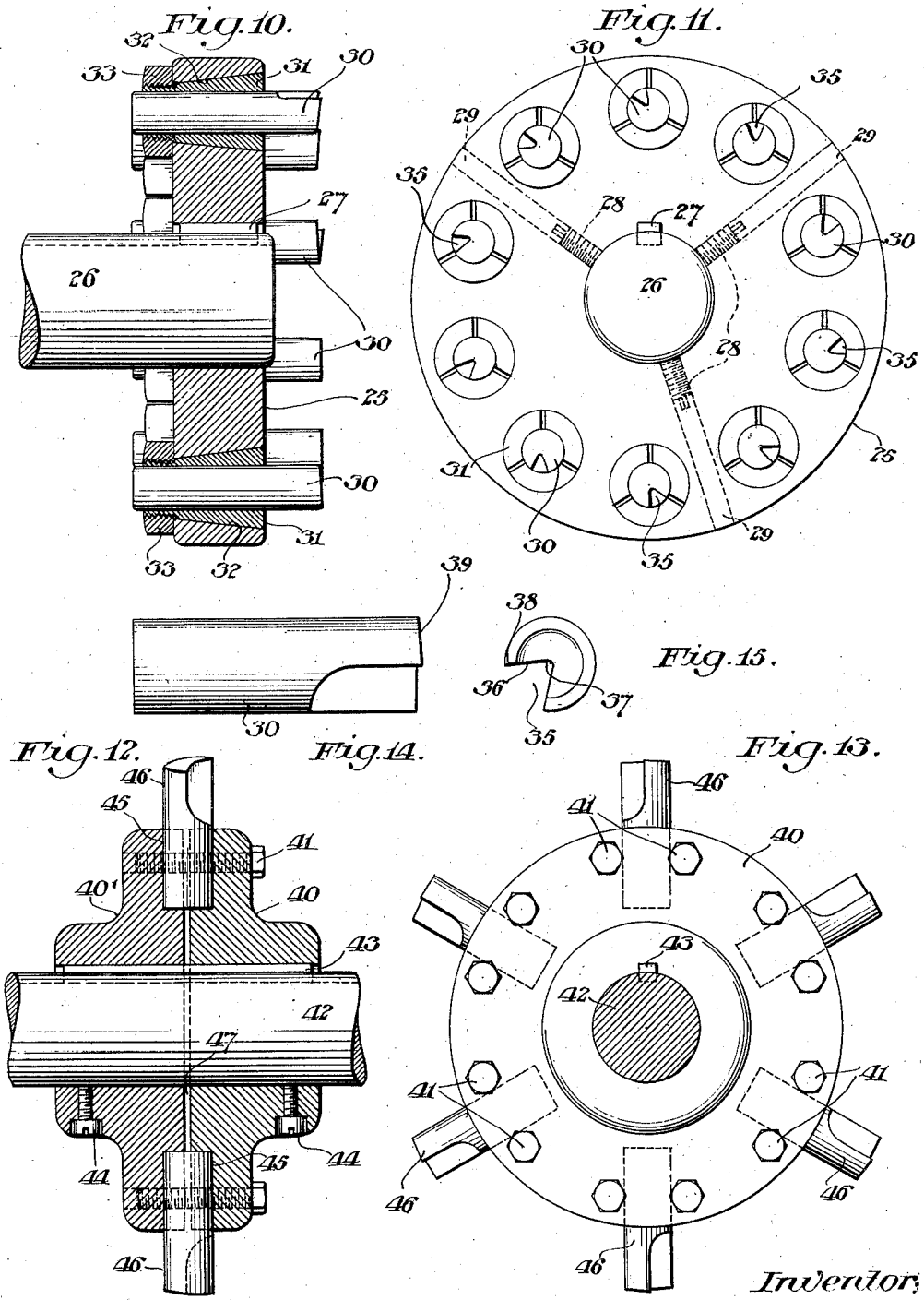
Inventor,
Peter P-G. Hall,
By [signature]
Attorneys Patented June 18, 1929.

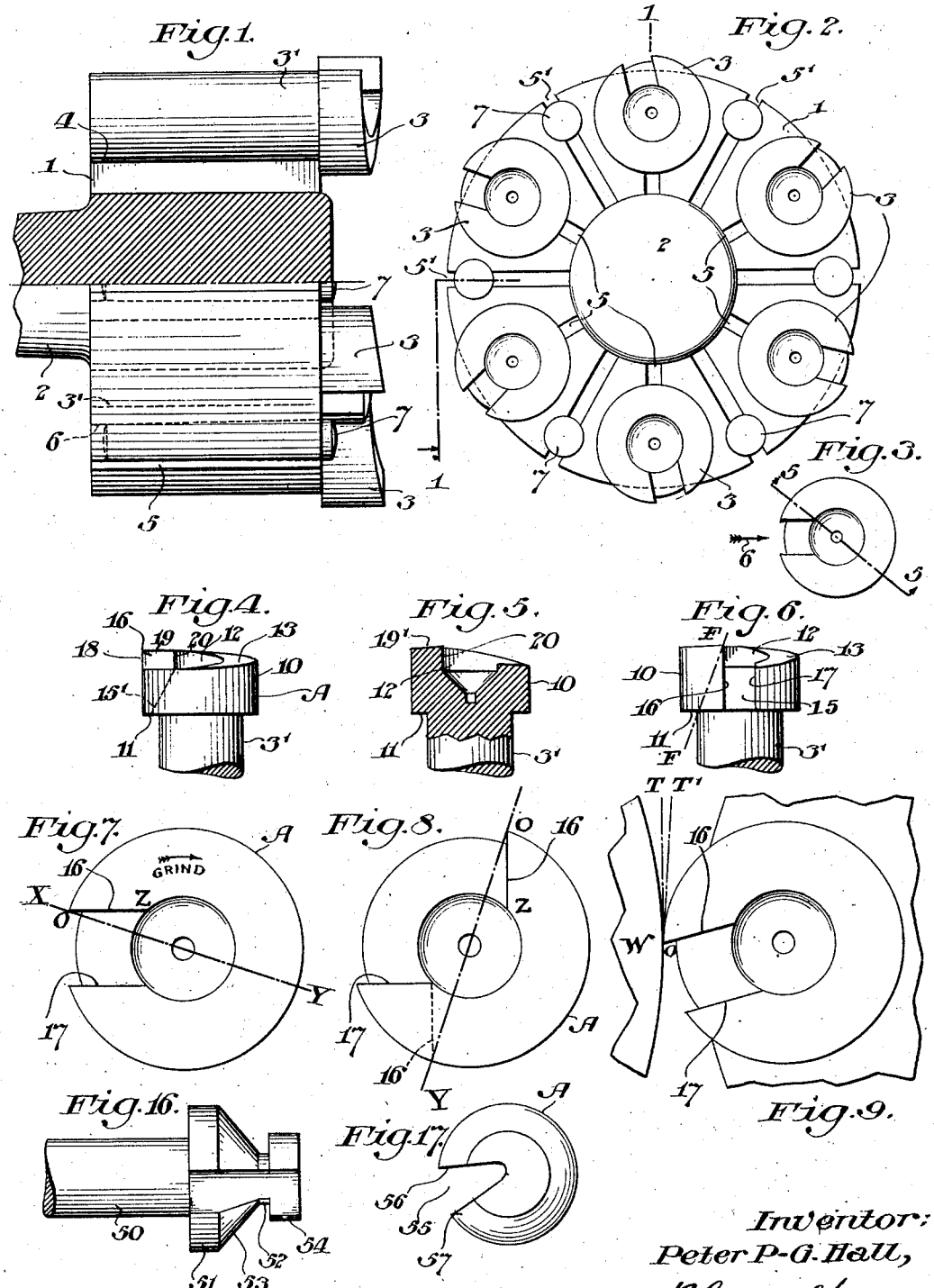

1,717,380

UNITED STATES PATENT OFFICE.

PETER P. G. HALL, OF PHILADELPHIA, PENNSYLVANIA.

MILLING CUTTER.

Application filed January 28, 1925. Serial No. 5,194.

My invention relates to cutters adapted for use primarily with milling machines but which may also be employed with other types of machines such as lathes, boring mills and the like if desired, a principal object of the invention being to provide an improved form of cutter embodying a plurality of interchangeable and replaceable elements which may be used for the forming of curved surfaces both exterior and interior, convex or concave and which may also be used with equal facility as a surfacing cutter for the production of plane surfaces.

Further objects of my invention are to provide a cutter of the character aforesaid in which the cutting elements may be readily ground or otherwise resharpened and in which each cutting element presents a maximum amount of metal in the rear of its cutting face thus permitting the resharpening of the cutter a great number of times before all the metal in the rear of the cutting face is exhausted or so diminished as to afford inadequate support therto.

A still further object of the invention is to provide such a milling cutter so constructed and arranged that the individual cutting elements may be ground or otherwise formed to present a cutting face or surface disposed at a predetermined angle with respect to the tangent to the surface of the work at the cutting point or, in machine shop parlance, to permit the cutting element to be ground or otherwise formed with a predetermined amount of "hook", and which is further so constructed and arranged that by suitable setting of the several cutter elements the angle between the tangent to the work at the cutting point and a tangent to the perimeter of the element at its leading or cutting edge may be varied, thus permitting variation in the "backing off" of each cutting element with respect to the work in conformity with the requirements of the particular job including the nature and speed of the cut being taken and the kind of metal of which the work consists, it being well known that the degree of backing off required for maximum efficiency of operation of any milling cutter is more or less dependent upon these factors.

Additional objects and novel features of design, construction and arrangement comprehended by my invention will more fully appear from the following description of certain embodiments thereof which are illustrated in the accompanying drawings.

While my invention readily lends itself to the varied requirements of modern machine shop practice and may thus partake of numerous forms, and while in carrying out my invention I may employ any suitable combination and arrangement of instrumentalities adapted to bring about the desired results and perform the requisite functions, I have illustrated in the accompanying drawings and will now proceed to describe certain preferred embodiments of the invention adapted for a wide range of milling operations and from which the nature and manner of performing the invention will be readily apparent to those skilled in the art.

In the said drawings Fig. 1 is a view partially in side elevation and partially in section on line 1—1 in Fig. 2 of one embodiment of the invention adapted for the milling of convex and concave surfaces such as the exterior and interior surfaces of cylindrical objects and also for the milling of plane surfaces and Fig. 2 is a front elevation thereof. Fig. 3 is a top plan view of one of the cutting elements removed from the cutter shown in said figures and Fig. 4 is a fragmentary view thereof as appearing when looking directly at the cutting face of the element. Fig. 5 is a similar view of the element showing a fragmentary central section thereof on line 5—5 in Fig. 3 looking in the direction of the arrows, while Fig. 6 is still another similar view of the element as it appears when looking in the direction of the arrow marked 6 in Fig. 3. Fig. 7 is an enlarged top plan partially diagrammatic view of one of the cutting elements and Fig. 8 a somewhat similar view, both illustrating the method of grinding the element, while Fig. 9 is a fragmentary partially diagrammatic view showing one of the cutting elements, a portion of the cutter body and a portion of the work on which the cutter is operating and illustrating the manner in which the cutter elements may be set to afford any predetermined degree of backing off. In Figs. 10 and 11 I have illustrated another form of cutter constructed in accordance with my invention, Fig. 10 being a central section through the cutter with certain parts shown in elevation and Fig. 11 a front elevation of the cutter, while in Figs. 12 and 13 I have illustrated still another form of cutter constructed in accordance with the invention, said figures respectively corresponding to Figs. 10 and 11 already described. Fig. 14 is an enlarged view in side elevation and Fig. 15 an end view of one of the cutting elements of the type employed in cutters shown in Figs. 10 to 13 inclusive but removed from the cutter, while in Figs. 16 and 17 I have shown a cutting element, respectively in side and end elevation, which is suitable for use in a cutter intended for "form" milling, that is, the production by a milling operation of a finished piece of predetermined form such, for example, as the male portion of a pipe union. Like symbols are used to designate corresponding parts throughout the drawing.

Referring now more particularly to the cutter shown in Figs. 1 and 2, the same may comprise a cylindrical base or body 1 disposed at the end of an arbor 2 adapted to be received in the spindle of the milling or other machine in the usual way. As shown, the body of the cutter is integral with the arbor which is a convenient construction when the cutter is of relatively small size but it will be understood that the cutter base, as in the forms of the invention shown in Figs. 10 to 13 inclusive, may be made separate from the arbor or other means by which it is supported on the machine tool and suitably rigidly operatively secured thereon.

The base is provided with a plurality of cutting elements 3, hereinafter more particularly described, which are removably supported on the base more or less adjacent its periphery in any convenient way and are preferably symmetrically disposed with respect to its central axis and located in suitably spaced relation with respect to each other. The particular means employed for securing the elements to the base forms no part of the present invention and hence any means adapted for that purpose may be utilized; in the particular embodiment shown each element is provided with a cylindrical shank 3' adapted to seat in a bore 4 extending through the base and for clamping the shanks rigidly to the base so as to hold the elements operatively immovable with respect thereto the base is provided with a plurality of radial slots 5 intersecting the bores and with other slots 5' intersecting tapered holes 6 adapted for the reception of taper pins 7 which are operative when driven into the holes to slightly displace the segments formed by the slots and constrict the bores 4 against the shanks of the elements so as to hold the latter with a firm and rigid grip. When such a construction is employed it will be obvious that any element may be readily removed from the base by driving out the adjacent taper pins so as to relieve the pressure on its shank. The slots 5 may either be symmetrically disposed with respect to each other so that the angles between adjacent pairs of slots are similar, or non-symmetrically disposed so that the said angles are not quite the same, this latter arrangement being of utility in eliminating "chattering" and tool marks in the work by preventing the cutting edges of the different cutting elements from following exactly the same path or "tracking" as the cutter revolves.

In the particular form of cutter to which reference is now being made six cutting elements are employed but a greater or less number may of course be utilized if desired, and as all of the elements are identical in form and construction the following description of one of them will suffice, reference in this connection being particularly had to Figs. 3 to 8 inclusive. While as will hereinafter more fully appear the specific form and construction of the cutting elements is capable of considerable variation the particular embodiment illustrated in the said figures and shown as assembled in the cutter in Figs. 1 and 2 comprises, as stated, a cylindrical shank 3' and a head 10 also cylindrical and of somewhat greater diameter than the shank so that a shoulder 11 is formed at the base of the head adapted to seat against the forward face of the base when the element is assembled therein so as to prevent longitudinal rearward movement of the element with respect to the base under the thrust induced by the cutting operation. The head may be of any convenient length and may if desired be provided with a central bore 12, conveniently of about one-half the diameter of the head, thus leaving an annulus or ring of metal 13 defined on one hand by the outer periphery or surface of the head and on the other by the wall of the bore 12. In order to form a cutting face or surface on the element, the head of the latter is provided when initially formed and conveniently by grinding, with an inwardly directed slot 15 whose bottom 15' may incline inwardly and upwardly when the element is viewed as in Fig. 4 from adjacent the base of the head to the bore 12, thereby leaving two faces 16 and 17 which form the sides of the slot, the former of which, for convenience, may be termed the cutting face of the element. Conveniently in the initial production of the element the slot may be symmetrically disposed with respect to a radial plane of the head, in consequence of which the faces 16 and 17 will be disposed on opposite sides of such plane but spaced therefrom.

It has been found in practical operation that the most satisfactory results are obtained when a predetermined angular relation is maintained between the cutting face 16 and a radial plane passing through the point of intersection of the cutting face and the periphery A of the head of the element (which point may be conveniently termed the "cutting point"), this plane being indicated by the broken line X—Y in Fig. 7, and that under most conditions of operation this angle between the said plane and the cutting face should approximate 15°. It will be apparent by reference to said figure, in which the cutting point is designated as O and said angle as ZOY, however, that this angle can be readily increased or decreased by suitably changing the direction of the cutting face 16 thus giving the cutting element a greater or less "hook" as it is termed in machine shop practice. The ability to vary this angle in my improved cutter is of great importance, since it enables the exact degree of hook desirable for a given operation to be performed at a given cutting speed and rate of feed upon metal of a given character, to be readily obtained by a simple grinding operation which can be performed on any modern grinder with the greatest exactitude, irrespective of the initial angular disposition of the cutting face and even though the element has been hardened.

The cutting face 16 is defined by a more or less longitudinally extending edge 18 and a substantially transversely extending edge 19 either of which, depending upon the manner in which the cutter is used, may operate as a cutting edge. Additionally, in the particular form of element now being described, the cutting face is still further defined by an edge 20 formed at the intersection of the face and the bore 12 but this latter edge never acts as a cutting edge and in those forms of element where the bore is entirely omitted it is of course correspondingly absent. Therefore in order to afford the requisite clearance in the rear of the cutting edge 19 the surface of the annulus 13 is formed in a receding spiral or helicoid extending from said cutting edge to the face 17 of the slot 15 and symmetrical with respect to the longitudinal axis of the head. But as it is ordinarily desirable that the cutting edge 19 should lie in a plane substantially normal to the longitudinal axis of the head I prefer to incline the said surface downwardly and outwardly with the result that the line of intersection of a radial plane passing through the longitudinal axis of the element and across the said surface at any point in its length will slope downwardly and outwardly from the inner to the outer edge of the surface, as clearly shown in Fig. 5, instead of being at right angles to the axis of the head. This inclination or slope of the surface which therefore takes substantially the form of an oblique helicoid should bear a definite relation to the angle ZOY to which reference has been made, for the reason that as the angle ZOY is increased the inclination of the surface from its inner to its outer edge should be correspondingly increased, and vice versa when the angle ZOY is decresed and the cutting edge 19 therefore approaches a more nearly radial direction, in order to constantly maintain the cutting edge substantially in a plane normal to the longitudinal axis of the head.

The cutting elements are ordinarily made from alloy steels which are relatively expensive and while such steels under conditions of use are capable of holding a sharp edge for relatively long periods of time, it sooner or later becomes necessary to resharpen the cutting elements so as to maintain the cutting edges 18 and 19 in proper operative condition and this result may be readily accomplished by merely grinding the cutting face 16 in a suitable grinder, the cutting element being usually removed from the base for that purpose. Of course during the grinding operation and assuming the cutter is to be thereafter employed on the same class of work as that upon which it was previously used, care should be taken to maintain the angle ZOY substantially constant so that the resharpened cutter, irrespective of the amount which the cutting face 16 is ground back in the direction of the arrow in Fig. 7, will have the same amount of hook as before it was resharpened. Thus, for example, in Fig. 8 is shown a cutting element originally of the form of that shown in Fig. 7 but in which the cutting face 16 has been ground back until instead of being substantially parallel with the face 17 it is substantially at right angles thereto, the slot 15, initially of relatively narrow width, having thus been widened until it subtends an arc of substantially 90°, but the angle ZOY still remaining the same. It will be furthermore apparent from an inspection of this figure that the resharpening operation may be repeated again and again until the cutting face reaches a point, as shown in dotted lines, in which its inner end is coincident with the inner end of the face 17 or until so little metal is left in the annulus 13 as to afford insufficient support to the cutting face, a condition which may obtain, where the element is subjected to heavy stresses in operation, before the limit just referred to has been reached, but in any case it will be apparent that the cutting element is capable of being resharpened for a very great number of times before the metal available to support the cutting face is exhausted, thus materially enhancing the economy of operation of the cutter.

The bores 4 in the cutter base are spaced at such distance from its axis that the heads of the cutting elements when the latter are assembled on the base will overhang the periphery of the latter as clearly shown in Fig. 2 and as the elements are all of identical size and the bores equidistantly spaced from the axis of the base the overhang of each element is identical with that of all of the others. Thus while it is desirable when the elements are assembled in the base that the cutting face 16 of each element make the same angle with a plane passing through the center of the element and the center of the base so that each element will have the same degree of hook with respect to the work and also the same amount of backing off with respect thereto as will hereinafter more fully appear, the fact that through an error in assembly one or more elements may have been rotated a little too far or not quite enough in their respective bores is immaterial upon the effective operative diameter of the cutter as a whole, for while under such circumstances the cutting element which has been thus improperly assembled may not operate quite as effectively upon the work as the other elements it can never alter the value or depth of the cut taken by the cutter as a whole as it is rotated with respect to the work.

Moreover, it will be apparent that the amount of backing off of each element or, in other words, the degree at which the peripheral surface A of the element in the rear of the cutting face 16 departs from the work can be readily varied as desired when the elements are assembled on the base by suitable positioning of each element thereon. The backing off may be measured by the angle formed between a tangent to the work at the cutting point and a tangent to the element at the cutting point; thus, in Fig. 9 where the work is designated as W and the cutting point as O, the angle referred to is that lying between the tangent TO to the work at the cutting point and the tangent T'O to the cutting element at the same point and it will therefore be apparent that as the element is turned in a clockwise direction the angle TOT' will increase with corresponding increase in the backing off and vice versa. Thus, the desired amount of backing off for a particular operation having been determined, it is a relatively simple matter to assemble all of the cutting elements in the base, preferably by means of a suitable gage, so that the backing off and hook of each element will bear the same relative relation to the work as that of all of the other elements, a condition which is desirable for the most satisfactory operation of the cutter.

Under certain conditions of operation, as when utilizing the cutter for a facing or surfacing operation, the removal of the metal is effected by the edge 19 of the element, and under such circumstances it becomes desirable to dispose the cutting face 16 so that instead of extending substantially parallel with the longitudinal axis of the element, it will lie in a plane which, if prolonged, would intersect that axis at some point above the element when viewed as in Figs. 4, 5 and 6. This manner of grinding or otherwise forming the face is indicated by the broken line F—F in Fig. 6 and it will thus be apparent that by varying the inclination of the face 16 a greater or less "hook" can be imparted with respect to the edge 19 when operating as a cutting edge just as by varying the angle ZOY a substantially similar result can be effected with respect to the cutting edge 18 as already explained.

In Figs. 10 and 11 I have shown a somewhat modified form of cutter embodying the principles of my invention and which is particularly suitable for manufacture in larger sizes and for heavier work than the form of cutter hitherto described. As shown in said figures this cutter comprises a circular base 25 centrally bored for the reception of an arbor 26 to which the base is secured by a key 27 and set screws 28 disposed at the inner ends of radial bores 29 formed in the base; other means of securing the base to the arbor or other supporting element may also be employed if desired.

The cutting elements 30 in this instance are of cylindrical form and of sufficient length to extend through tapered and split collets 31 seated in suitably tapered bores 32 symmetrically disposed with respect to the central axis of the base and arranged in spaced relation with each other more or less adjacent the periphery of the base. The rear ends of the collets which may be cylindrical in form project beyond the rear face of the base and are provided with screw threads for the reception of nuts 33 by means of which the collets may be drawn into the tapered bores 32 so as to constrict the collets against the elements and thus hold the latter rigidly to the base in suitably adjusted position. The arrangement just described affords a convenient manner of holding the elements in adjusted position but any other means suitable for that purpose may be employed if desired.

It will of course be understood that while the cutter is shown as embodying ten cutting elements a greater or less number may be employed.

Each element, as stated, is of generally cylindrical contour and with a view to providing the requisite cutting face a longitudinally extending slot 35 is milled, ground or otherwise formed in that portion of the element which projects beyond the forward face of the base when the element is assembled thereon. Conveniently this slot may be initially formed so as to be symmetrical with a radial plane of the element thus providing faces 36 and 37 the former of which forms the cutting face corresponding to the cutting face 16 in the form of element hitherto described. With a view to providing the requisite clearance in the rear of the cutting edge 38 formed by the intersection of the surface 36 and the end surface 39 of the element the latter is preferably formed to substantially present an oblique helicoidal surface or spiral receding from the cutting edge to the face 37 which is also outwardly and downwardly inclined similarly to the surface 13 in the form of element hitherto described and in conformity with the amount of hook determined by the disposition of the cutting face 36 so that the edge 38 will lie substantially in a plane normal to the longitudinal axis of the element.

The elements, having been formed substantially as described, are assembled in the base of the cutter and clamped rigidly thereto through the medium of the contracting collets or other means supplied for that purpose in such manner that their cutting faces all form the same angle with respect to the radii of the base which pass through the axes of the respective elements or to any other convenient reference line or plane so that each element will present the same degree of hook with respect to the work when the cutter is in operation and, additionally, in such manner that all of the elements extend for the same distance beyond the forward face of the base, these results being conveniently brought about by the employment of suitably designed gages or jigs. In the operation of this form of cutter either the edges 38 formed at the intersection of the cutting faces 36 and the end surface of the elements or the edges formed by the intersection of the cutting faces and the peripheries of the elements may operate as the cutting edges depending upon the manner in which the cutter is being utilized and the kind of work being performed therewith, and it will of course be apparent that whenever the cutting edges of the elements become dull the latter may be readily removed from the base and resharpened by grinding back their cutting faces 36 in a manner similar to that hitherto described more in detail in connection with the form of element shown in Figs. 1 to 9 inclusive.

In Figs. 12 and 13 I have illustrated still another form of cutter embodying the principles of my invention and conveniently employing elements substantially similar to those shown in Figs. 14 and 15. This form of cutter, which is particularly adapted for heavy work and especially for the production of cylindrical bores although equally adapted for the facing of ends of hollow objects such as pipes and the like, comprises a body consisting of similar opposed portions 40, 40' adapted to be drawn together by bolts 41 and centrally bored for the reception of an arbor or bar 42 by which the cutter is supported and driven, movement of the cutter thereon being prevented by a key or feather 43 and set screws 44 or in any other suitable way. Each of the portions 40, 40' is provided with an annular boss at its inner extremity and these bosses are provided with radial inwardly extending substantially semi-circular bores so that when the two halves of the body are drawn together by the bolts 41 inwardly extending radial recesses or sockets 45 are formed adapted for the reception of the inner ends of the cutting elements 46, the diameter of these recesses being such that by setting up on the bolts the elements may be firmly clamped therein before the adjacent faces of the two halves of the base are brought into contact, thus leaving a small amount of clearance 47 between said faces when the cutter is fully assembled, and the sockets 45 are preferably of such depth that when the inner ends of the elements are seated on the inner ends of the sockets the assembled cutter will present the desired overall diameter. The cutting elements are, of course, preferably so assembled in the cutter that each element will present the same degree of hook with respect to the work on which the cutter may be operating as all of the other elements.

My invention also readily lends itself to the production of a cutter of a type suitable for the production of work of given configuration by an operation known as "form" milling, that is, the production of work having a surface of irregular configuration as distinguished from a plane surface or a curved surface all points of which are equidistant from the axis of the piece, and in Figs. 16 and 17 I have illustrated a cutting element suitable for such form milling and intended in this instance for the production by a milling operation of the male portion of a pipe union. It will be observed that this element comprises a shank 50 adapted to seat in the cutter base and a cutting head or portion having cylindrical regions 51 and 52 of different diameters connected by a cone-shaped region 53 and another cylindrical region 54 adjacent the region 52 of still different diameter from the other cylindrical regions. The head portion of the element has a slot 55 ground or otherwise formed therein so as to provide a cutting face 56 and an opposite face 57 respectively corresponding to faces 16 and 17 in the form of cutting element herein first described, the face 56 being preferably so disposed as to provide the desired degree of hook when the element is assembled in the base. In this type of element the edge formed by the intersection of the face 56 and the periphery A forms the cutting edge and as the element becomes dull this face can be ground back in the resharpening operation in the manner similar to that heretofore described in connection with the corresponding faces of the other forms of elements. It will of course be understood that the particular configuration of the elements when employed for form milling will be determined by the configuration of the piece which is to be produced and in consequence the element shown in Figs. 16 and 17 is merely typically illustrative of elements intended for that purpose.

It will thus be apparent that I have provided a cutter adapted for a wide range of milling or other analogous operations and embodying a plurality of independent, interchangeable and replaceable cutting elements each presenting one or more cutting edges and so arranged in the cutter that they will operate consecutively on the work as the cutter rotates with respect thereto; additionally, that the elements are of such design as to permit their production at relatively low cost and to afford a maximum amount of metal in the rear of the cutting face or surface whereby the element may be resharpened a very large number of times before becoming useless. Furthermore, by reason of the design and construction of my improved cutter the cutting elements may be formed and thereafter assembled in the cutter in such manner that the cutting face of each element will operate on the work at a predetermined angle with respect thereto, which angle is capable of variation as desired, and will also present a predetermined degree of backing off with respect to the work while operating thereon, thus enabling the cutter to be readily adjusted and set for the attainment of the most satisfactory results under operative conditions.

While I have herein described certain forms of my invention with considerable particularity I do not thereby desire or intend to in any manner specifically limit myself thereto as changes and modifications may be made in the design, construction and arrangement of the various parts and in the precise form of the cutting elements employed so as to better adapt the cutter for use under given operative conditions or for other purposes as may be desired without departing from the spirit and scope of the invention as defined in the appended claims.

Having thus described my invention, I claim and desire to protect by Letters Patent of the United States:

1. A cutting element adapted for operative assembly in a cutter and comprising a head of cylindrical cross section provided with an inwardly extending slot, one wall of which forms the cutting face of the head and intersects both the peripheral and end surfaces of the head, said last mentioned surface in the rear of the line of intersection having the form of an oblique helicoid.

2. A cutting element adapted for operative assembly in a cutter and comprising a head of cylindrical cross section provided with an inwardly extending slot, one wall of which forms the cutting face of the head and intersects both the peripheral and end surfaces of the head, said last mentioned surface in the rear of the line of intersection having substantially the form of an oblique helicoid of inclination such that the line of intersection of said cutting face and the end surface of the element will lie substantially normal to the longitudinal axis of the element.

3. A cutting element adapted for operative assembly in a cutter and comprising a head of cylindrical cross section provided with an inwardly extending slot, one wall of which forms the cutting face of the head and intersects both the peripheral and end surfaces of the head, said last mentioned surface in the rear of the line of intersection having substantially the form of a receding spiral inclined outwardly from the axis of the element sufficiently to cause the line of intersection of said face and said end surface to be disposed substantially normal to the longitudinal axis of the element.

4. A cutting element adapted for operative assembly in a cutter and having a head of cyclindrical cross section provided with an inwardly directed slot one wall of which, forming the cutting face of the element, intersects the peripheral and end surfaces of the element and forms an angle between zero and 90° with the radial plane passing through the line of intersection of said face and said peripheral surface, said end surface in the rear of its line of intersection with said face presenting substantially the form of an oblique helicoid of such obliquity that said line of intersection is substantially normal to the longitudinal axis of the element.

In witness whereof, I have hereunto set my hand this 27th day of January, 1925.

PETER P-G. HALL.